(12) United States Patent
Zhao et al.

(10) Patent No.: US 9,218,651 B2
(45) Date of Patent: Dec. 22, 2015

(54) IMAGE PROCESSING METHOD FOR DYNAMICALLY ADJUSTING LUMINANCE AND CONTRAST OF IMAGE

(71) Applicants: NOVATEK (SHANGHAI) CO., LTD., Shanghai (CN); NOVATEK MICROELECTRONICS CORP., HsinChu (TW)

(72) Inventors: Bo Zhao, Chengdu (CN); Guang-Zhi Liu, Shanghai (CN); Jian-De Jiang, ShanXi (CN)

(73) Assignees: NOVATEK (SHANGHAI) CO., LTD., Shanghai (CN); NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 14/277,481

(22) Filed: May 14, 2014

(65) Prior Publication Data
US 2015/0332442 A1 Nov. 19, 2015

(51) Int. Cl.
*G06K 9/40* (2006.01)
*G06T 5/00* (2006.01)

(52) U.S. Cl.
CPC ....... *G06T 5/007* (2013.01); *G06T 2207/20012* (2013.01); *G06T 2207/20021* (2013.01)

(58) Field of Classification Search
USPC ........... 382/274, 162, 167; 345/589; 347/119; 348/222.1, 224.1, 231.1, 231.5, 234, 348/241, 345, 349, 371; 386/201; 358/3.06, 358/1.9, 504, 518, 529
See application file for complete search history.

(56) References Cited

U.S. PATENT DOCUMENTS

| | | | |
|---|---|---|---|
| 8,488,055 B2 * | 7/2013 | Cote et al. | 348/371 |
| 8,508,612 B2 * | 8/2013 | Cote et al. | 348/222.1 |
| 8,508,621 B2 * | 8/2013 | Cote et al. | 348/231.99 |
| 8,531,542 B2 * | 9/2013 | Cote et al. | 348/222.1 |
| 8,605,167 B2 * | 12/2013 | Cote et al. | 348/223.1 |
| 8,629,913 B2 * | 1/2014 | Cote et al. | 348/222.1 |
| 8,643,770 B2 * | 2/2014 | Cote et al. | 348/371 |

* cited by examiner

*Primary Examiner* — Anh Do
(74) *Attorney, Agent, or Firm* — Rabin & Berdo, P.C.

(57) ABSTRACT

An image processing method for adjusting the luminance and contrast of an input image comprises the following steps. First, local spatial luminance statistics is performed on the first pixels of the input image to generate a luminance image including a plurality of second pixels. Then, from a preset mapping curve group comprising a plurality of smooth mapping curves, a corresponding smooth mapping curve is selected for each of the second pixels according to an adjusting function. Next, the pixel values of the second pixels are adjusted according to the corresponding smooth mapping curves to generate an adjusted image.

10 Claims, 4 Drawing Sheets

| M1 | | M2 | |
|---|---|---|---|
| 0.5 | 1.5 | 3 | 3.5 |
| 0.5 | 1.5 | 3 | 2.5 |
| 1.5 | 2 | | |
| 2.5 | 2 | | |

M3

→

| M1' | | M2' | |
|---|---|---|---|
| 1 | 1 | 3 | 3 |
| 1 | 1 | 3 | 3 |
| 2 | 2 | | |
| 2 | 2 | | |

M3'

→

| M1" | | M2" | |
|---|---|---|---|
| 1 | 2 | | |
| 1.5 | 2 | | |
| | | | |
| | | | |

M3"

IMAGE PROCESSING METHOD FOR DYNAMICALLY ADJUSTING LUMINANCE AND CONTRAST OF IMAGE

TECHNICAL FIELD

The disclosure relates in general to an image processing method, and more particularly to an image processing method for dynamically adjusting the luminance and contrast of an image.

BACKGROUND

Recently, the development of multimedia applications boosts the need for image processing. The adjustment of the image dynamic range includes the brightness adjustment and the contrast adjustment. Conventionally, linear mapping models based on global or local features of an image is used to simply stretch or compress the image data. For example, conventional image processing technique may increase or decrease the global brightness of an image according a single adjusting function.

However, the abovementioned image processing method can not ensure that the color and details of the image is maintained in the effective dynamic range. Usually, stronger image adjustment causes the loss of color information and saturation.

Therefore, there is a need for an image processing method for dynamically adjusting luminance and contrast of image.

SUMMARY

The disclosure is directed to an image processing method for dynamically adjusting luminance and contrast of image. By using local luminance statistics information and preset smooth mapping curves, together with adjustment of specific parameters, local adaptive color adjustment of an image can be achieved, and the dynamic range of the image can be adjusted smoothly and dynamically.

According to one embodiment, an image processing method for adjusting the luminance and contrast of an input image including a plurality of first pixels is provided. The image processing method comprises the following steps. First, local spatial luminance statistics is performed on the first pixels of the input image to generate a luminance image including a plurality of second pixels. Then, from a preset mapping curve group comprising a plurality of smooth mapping curves, a corresponding smooth mapping curve is selected for each of the second pixels according to an adjusting function. Next, the pixel values of the second pixels are adjusted according to the corresponding smooth mapping curves to generate an adjusted image.

The above and other aspects of the invention will become better understood with regard to the following detailed description of the preferred but non-limiting embodiments. The following description is made with reference to the accompanying drawings.

Figure 1:
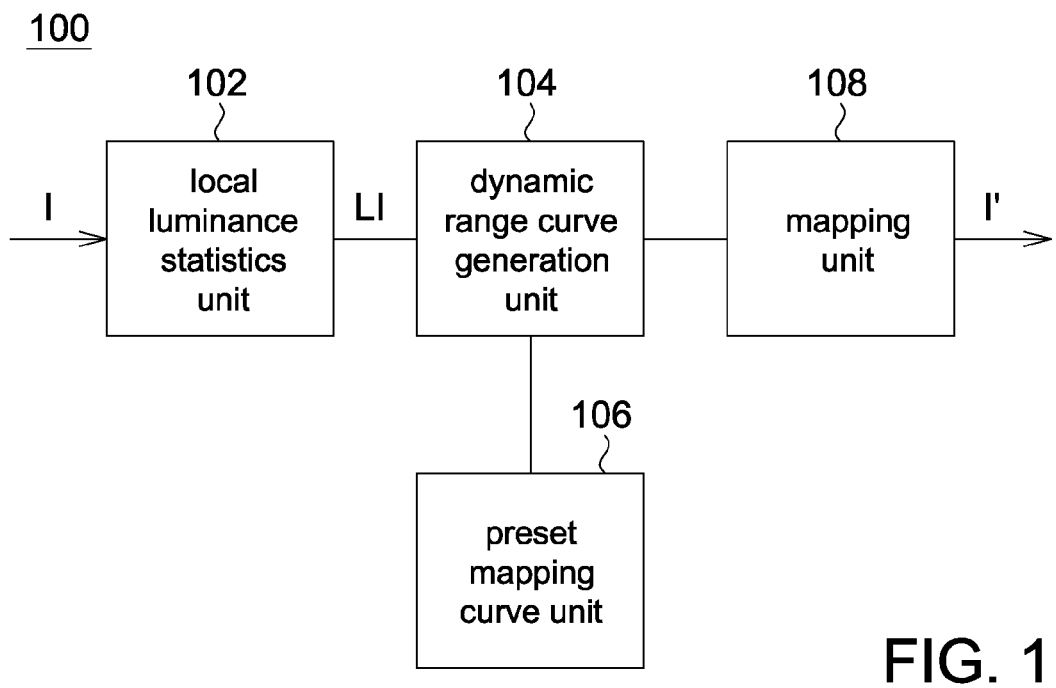
FIG. 1 shows a block diagram of an image processing device according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Reference will now be made in detail to examples of the present disclosure. The examples are demonstrated and made as examples only, and are not limited to the particular examples made. Examples of the examples are illustrated in the accompanying drawings, wherein like reference numerals refer to like elements throughout, and secondary elements are omitted in the examples disclosed below for highlighting the technical features of the disclosure.

FIG. 1 shows a block diagram of an image processing device 100 according to an embodiment of the present invention. The image processing device comprises a local luminance statistics unit 102, a dynamic range curve generation unit 104, a preset mapping curve unit 106 and a mapping unit 108. The local luminance statistics unit 102 is configured to perform local spatial luminance statistics on the pixels (first pixels) of an input image I to generate a luminance image L1 in which the luminance/pixel values changes smoothly. In the embodiment, the pixels (second pixels) of the luminance image LI are corresponding to the first pixels of the input image I one-to-one, and the size of the input image I is the same as the luminance image LI.

The dynamic range curve generation unit 104 is configured to select a corresponding smooth mapping curve from the preset mapping curve unit 106 for each of the second pixels of the luminance image LI. The selected smooth mapping curves will be used in the subsequent image adjusting process. The preset mapping curve unit 106 is configured to store a preset mapping curve group including a plurality of smooth mapping curves, where each of the smooth mapping curves may be, for example, corresponding to a look-up table.

The mapping unit 108 is configured to adjust the pixel values of the second pixels to generate an adjusted image I' according to the corresponding smooth mapping curves. Since the image processing device 100 of the present embodiment adjusts the pixel values of the pixels of an image based on the corresponding smooth mapping curves adaptively chosen for each of the pixels, local adaptive color adjustment of the image can be achieved, and the dynamic range of the image can be adjusted smoothly and dynamically.

The local luminance statistics unit 102, the dynamic range curve generation unit 104 and the mapping unit 108 can be realized by, for example, hardware circuits having capability of image processing. The preset mapping curve unit 106 can be realized by, for example, double data rate SDRAM or other types of memory circuit. It is understood that the local luminance statistics unit 102, the dynamic range curve generation unit 104, and the mapping unit 108 are not limited to be realized by independent hardware circuit structures. These units 102, 104, 106 and 108 can also be realized in an integrated circuit.

Figure 2:
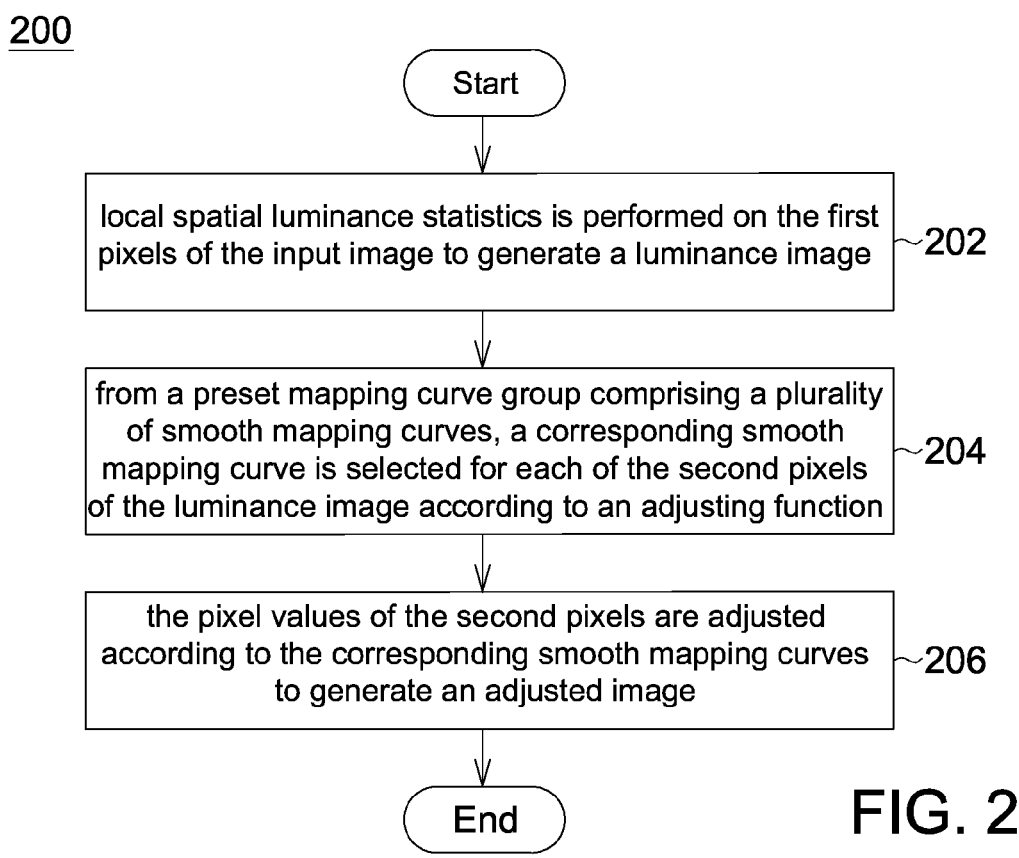
FIG. 2 shows a flow chart of an image processing method of the image processing device.

FIG. 2 shows a flow chart of an image processing method 200 of the image processing device 100. The image processing method 200 can be used for adjusting the luminance and contrast of an input image I including a plurality of first pixels. The image processing method 200 comprises the following steps.

First, as step 202, the local luminance statistics unit 102 performs local spatial luminance statistics on the first pixels of the input image I to generate a luminance image LI. The luminance image LI includes a plurality of second pixels. In an example, the local luminance statistics unit 102 may divide the input image I into a plurality of image blocks (which are overlapped or non-overlapped) and perform averaging operation (i.e., downscale processing) on the pixel values of the first pixels in each of the image blocks to generate a downscale image. Then, the local luminance statistics unit 102 may perform interpolation operation (i.e., upscale processing) on the downscale image to generate the luminance image LI. The size of the luminance image LI may be the same as the input image I. Due to the local luminance statistics processing, the luminance image LI can be smoother than the original input image I in spatial statistics, and the distribution of the pixel values of pixels of the luminance image LI can be limited to a specific range, so that the subsequent image processing can be significantly facilitated.

At step 204, the dynamic range curve generation unit 104 selects a corresponding smooth mapping curve from a preset mapping curve group comprising a plurality of smooth mapping curves for each of the second pixels of the luminance image LI according to an adjusting function. Each of the smooth mapping curves of the preset mapping curve group is correspond to a luminance value to suit the adjustment for different brightness environments. In an example, each smooth mapping curve is with an index for selection. The adjusting function can be expressed as follows:

$$i = \text{midCurveIndex} + (\text{lumaAPL} - \text{midCurveIndex}) * G;$$

where i denotes the index, midCurveIndex denotes a middle index, lumaAPL denotes the pixel value of a target second pixel of the second pixels, and G denotes an adjustable value. The adjustable value (G) can be an arbitrary number as long as the value of the index is limited to a range of numbers designated to the smooth mapping curves.

In the example, when the value of the index (i) is larger, the luminance value corresponding to the smooth mapping curve selected by the index is smaller (i.e., the luminance of the target second pixel is lower). Thus, if the pixel value of the target second pixel is smaller than the middle index (midCurveIndex), i.e., (lumaAPL−midCurveIndex)<0, the magnitude of the luminance value corresponding to the smooth mapping curve selected by the index is positively correlated to the magnitude of the adjustable value (G). That is, the luminance value corresponding to the smooth mapping curve is larger as the adjustable value is larger. In contrast, if the pixel value of the target second pixel is larger than the middle index, i.e., (lumaAPL−midCurveIndex)>0, the magnitude of the luminance value corresponding to the smooth mapping curve selected by the index is negatively correlated to the magnitude of the adjustable value. That is, the luminance value corresponding to the smooth mapping curve is smaller as the adjustable value is larger. In addition, if the pixel value of the target second pixel is equal to the middle index, the smooth mapping curve corresponding to the middle index is selected for adjusting the pixel value of the target second pixel. Or, the pixel value of the target second pixel is not adjusted.

Accordingly, by appropriately setting the value of the middle index and the adjustable value, the image processing device 100 and the image processing method 200 of the present invention can adaptively select a corresponding smooth mapping curve to adjust or remap the pixel value of the target second pixel. Therefore, local adaptive color adjustment of an image can be achieved. It is understood that the present invention is not limited to the above examples. That is, modifications made to the above examples for adaptively selecting smooth mapping curves to adjust or remap the pixel values of the second pixels are all encompassed within the scope of the present invention.

At step 206, the mapping unit 108 adjusts the pixel values of the second pixels according to the selected smooth mapping curves to generate an adjusted image I'. In an example, the adjusted image I' comprises a plurality of adjusted pixels (third pixels) corresponding to the second pixels one-to-one. The mapping unit 108 remaps the pixel value of the target second pixel according to the smooth mapping curve selected by the index (i) to generate the pixel value of the corresponding third pixel.

According to the above, the image processing device 100 and the image processing method 200 according to the embodiments of the present invention uses local luminance statistics information and preset smooth mapping curves, together with adjustment of specific parameters, to achieve local adaptive color adjustment of an image. Therefore, the dynamic range of the image can be adjusted smoothly and dynamically.

For better illustration, detailed descriptions associated with the operations of step 202 of the image processing method 200 are given below with reference to FIGS. 3A, 3B and 3C.

Figure 3A:
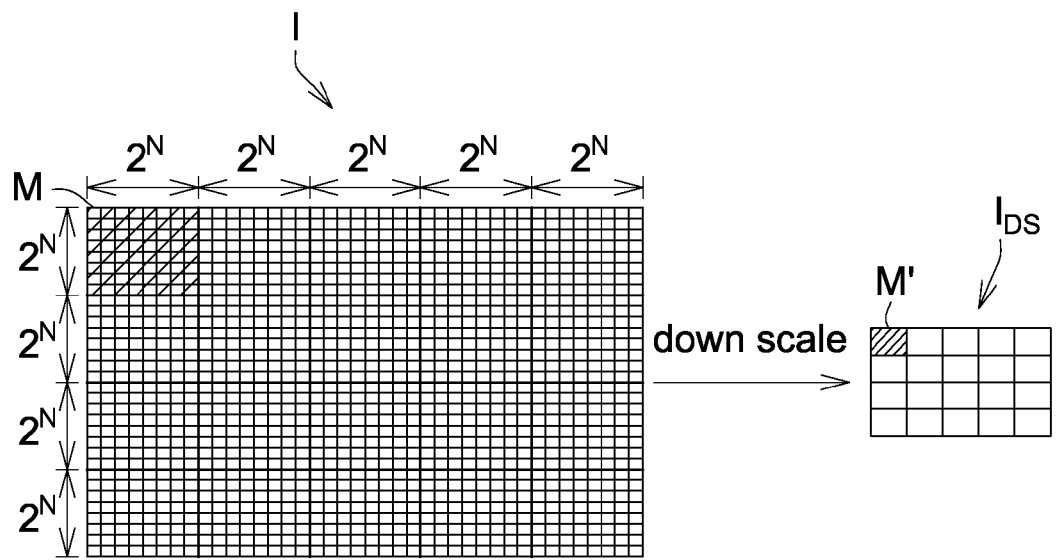
FIG. 3A shows a schematic diagram of generating a downscale image by performing downscale operation on the input image.

FIG. 3A shows a schematic diagram of generating a downscale image $I_{DS}$ by performing downscale operation on the input image I. In the example, the input image I is divided into a plurality of image blocks M. Each of the image blocks M includes $2^N \times 2^N$ pixels (denoted as squares in FIG. 3A), where N in an integer equal to 3, for example. The downscale image $I_{DS}$ can be obtained by averaging the pixel values of the pixels in each image block M of the input image I. In this way, each image block M' of the downscale image $I_{DS}$ is corresponding to each image block M of the input image I one-to-one, and the pixel value of an image block M' is equal to the average of the pixel values of the corresponding image block M.

Figure 3B:
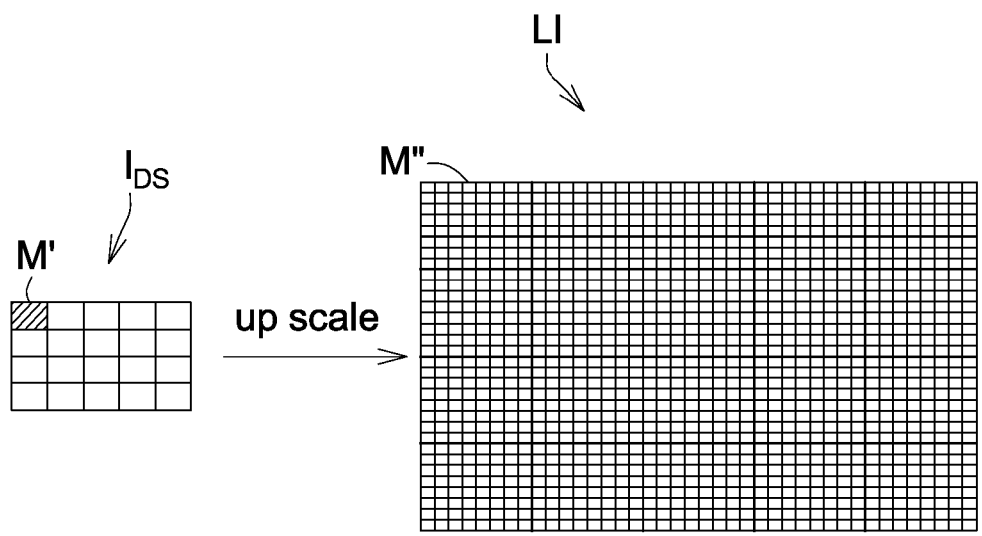
FIG. 3B shows a schematic diagram of generating a luminance image by performing upscale operation on the downscale image.

FIG. 3B shows a schematic diagram of generating a luminance image LI by performing upscale operation on the downscale image $I_{DS}$. As shown in FIG. 3B, by performing upscale operation (ex., bilinear interpolation operation) on the downscale image $I_{DS}$, the luminance image LI having the same size as the input image I can be obtained. In such circumstance, each pixel of the luminance image LI (denoted as squares in FIG. 3B) is corresponding to each pixel of the input image I one-to-one. Since the luminance image LI is generated by performing downscale and upscale operations on the input image I, the luminance image LI will get more smoothness than the input image I in spatial statistics. Moreover, since the distribution of the pixel values of pixels of the luminance image LI is limited to a specific range, the image processing can be significantly facilitated.

Figures 3C, 4:
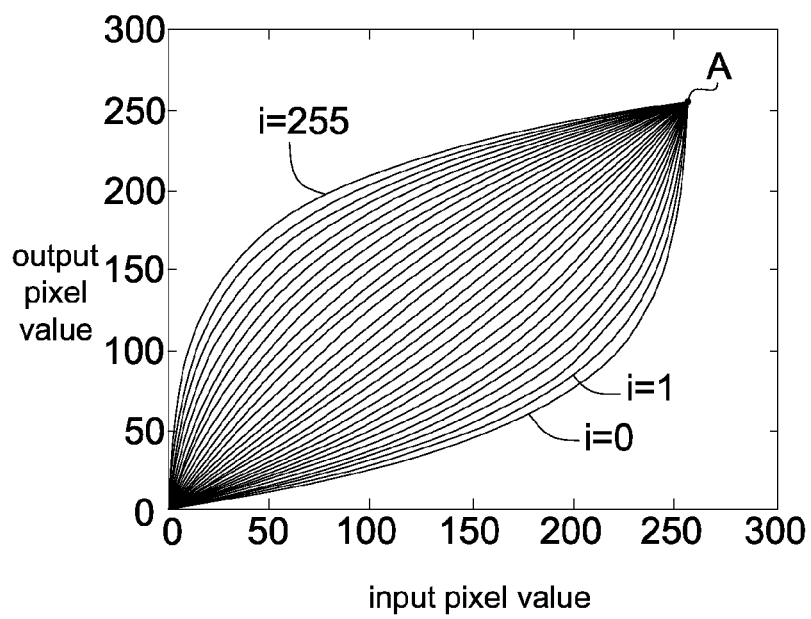
FIG. 3C shows a schematic diagram of generating the luminance image from the input image.
FIG. 4 shows a schematic diagram of a preset mapping curve group comprising a plurality of smooth mapping curves.

FIG. 3C shows a schematic diagram of generating the luminance image LI from the input image I. In FIG. 3C, the image blocks M1-M3 represent three neighborhood blocks of the input image I; the image blocks M1'-M3' represent three neighborhood blocks of the downscale image $I_{DS}$; and the image blocks M1"-M3" represent three neighborhood blocks of the luminance image LI. In the example, each of the image blocks M1-M3 comprises four pixels (denoted as squares), where the pixel values of the four pixels of the image block M1 are 0.5, 1.5, 1.5 and 0.5, respectively (in order of upper left, upper right, lower right and lower left). Accordingly, after the downscale operation is performed on the input image I, the pixel values of the pixels of the image block M1', which is corresponding to the image block M1, are equal to $$1\left(=\frac{0.5+1.5+1.5+0.5}{4}\right).$$

Likewise, the pixel values of the four pixels of the image block M2 are 3, 3.5, 2.5 and 3, respectively (in order of upper left, upper right, lower right and lower left). Accordingly, after the downscale operation is performed on the input image I, the pixel values of the pixels of the image block M2', which is corresponding to the image block M2, are equal to $$3\left(=\frac{3+3.5+2.5+3}{4}\right).$$

Similarly, the pixel values of the four pixels of the image block M3 are 1.5, 2, 2 and 2.5, respectively (in order of upper left, upper right, lower right and lower left). Accordingly, after the downscale operation is performed on the input image I, the pixel values of the pixels of the image block M3', which is corresponding to the image block M3, are equal to $$2\left(=\frac{1.5+2+2+2.5}{4}\right).$$

Due to the interpolation operation, the pixel values in each image blocks M1"-M3" of the luminance image LI may change gently and continuously. Taking the image block M1" for example, the pixel values of the four pixels are 1, 2, 2 and 1.5, respectively (in order of upper left, upper right, lower right and lower left). Since the pixel values of the image blocks M2' and M3' adjacent to the image block M1' are larger than the pixel values of the image block M1', the pixel values of the pixels, which are closer to the neighborhood block M2" or M3", of the image block M1" of the luminance image LI are larger. In other words, the pixel values of the pixels in each image block of the luminance image LI are related to the adjacent image blocks thereof, and show gentle and continuous change in spatial statistics. Moreover, it is understood that the above example that showing four image blocks in each image block is for explanation purposes only, and not to be used to limit the number of pixels in the image blocks of the present invention.

FIG. 4 shows a schematic diagram of a preset mapping curve group comprising a plurality of smooth mapping curves. The smooth mapping curves reflect the relationship between the input pixel values and the output pixel values. In an example, the smooth mapping curves are preset according to the human eye's perception of color. As shown in FIG. 4, each of the smooth mapping curves is with an index (i). The smooth mapping curves changing from concave to convex are corresponding to indexes i=0-255, respectively, and each of smooth mapping curves is corresponding to a luminance value. For a concave smooth mapping curve, if the value of the corresponding index (i) is smaller, the luminance suppression effect on the pixel is stronger. In contrast, for a convex smooth mapping curve, if the value of the corresponding index (i) is larger, the luminance enhancement effect on the pixel is stronger. Accordingly, through the preset smooth mapping curves, the degree of adjustment of the pixel values/luminance can be adaptively determined. For example, a smooth mapping curve with a larger index (i) can be chosen for a pixel located in the dark region (corresponding to a lower luminance value) of an image to enhance the brightness, while a smooth mapping curve with a smaller index (i) can be chosen for a pixel located in the bright region (corresponding to a higher luminance value) of the image to suppress the brightness. It is understood the present invention is not limited to the above examples. The designation of index of the smooth mapping curves can be implemented by other forms of designation.

The smooth mapping curves of the preset mapping curve group have the same endpoint A. The coordinate of the endpoint A may be corresponding to (maximum of the output pixel values, minimum of the input pixel values). Taking FIG. 4 for example, the coordinate of the endpoint A is (255, 255). In this way, it ensures that during the process of the pixel value adjustment, the saturation of the image will not be lost.

Figure 5:
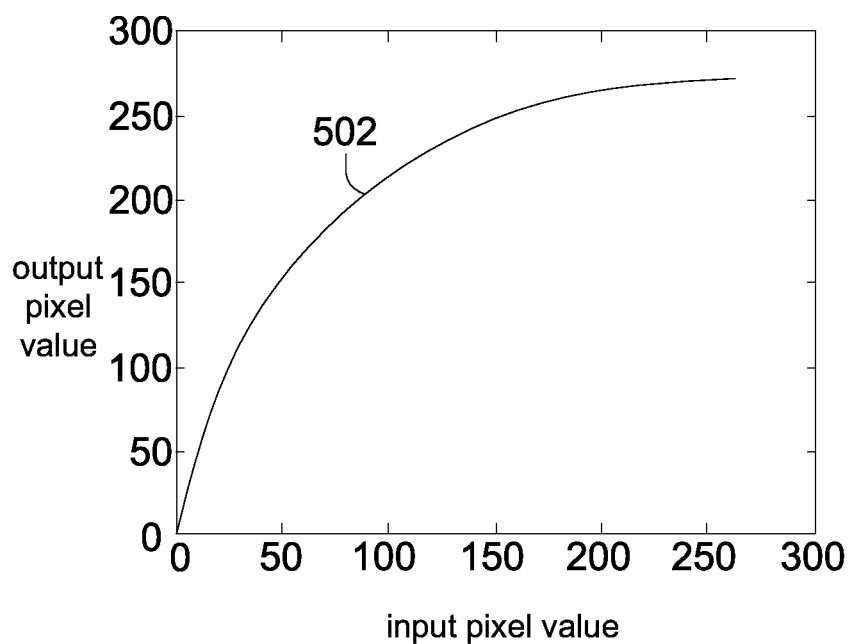
FIG. 5 shows a schematic diagram of a smooth mapping curve corresponding to a pixel.

FIG. 5 shows a schematic diagram of a smooth mapping curve 502 corresponding to a pixel. The smooth mapping curve 502 may be selected by, for example, the abovementioned adjusting function. By selecting a corresponding smooth mapping curve for each of the pixels and performing pixel value adjustment on the pixels, the adjusted image I' can be generated. Since each pixel of an image is corresponding to a selected smooth mapping curve, which is used as the basis for the pixel value adjustment/remapping, the image processing device and the image processing method of the present invention is able to perform local adaptive color adjustment on the image, and the dynamic range of the image can be adjusted smoothly and dynamically.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image processing method for adjusting the luminance and contrast of input image data including a plurality of first pixel values, comprising:
generating luminance image data including a plurality of second pixel values from the input image data with using local spatial luminance statistics on the first pixel values included in the input image data;
from a preset mapping curve group comprising a plurality of smooth mapping curves, selecting a corresponding smooth mapping curve for each of the second pixel values based on a difference between a respective first pixel value and a generated second pixel value corresponding to said respective first pixel value; and
generating adjusted image data including a plurality of adjusted pixel values by adjusting the plurality of second pixel values included in the luminance image data using the selected smooth mapping curve so that a dynamic range of each of the adjusted pixel values included in the adjusted image data is gradually decreased or increased.

2. The image processing method according to claim 1, wherein the step of generating the luminance image data comprises:

dividing the input image data into a plurality of image data blocks;

performing averaging operation on the first pixel values included in each of the image data blocks to generate downscale image data; and performing interpolation operation on the downscale image data to generate the luminance image data.

3. The image processing method according to claim 2, wherein the image data blocks of the input image data are overlapped or non-overlapped.

4. The image processing method according to claim 2, wherein the size of an input image is the same as the size of a luminance image, second pixels included in the luminance image are corresponding to first pixels included in the input image one-to-one.

5. The image processing method according to claim 1, wherein each of the smooth mapping curves is corresponding to a luminance value.

6. The image processing method according to claim 5, wherein each of the smooth mapping curves has the same endpoint.

7. The image processing method according to claim 5, wherein each of the smooth mapping curves is with an index for selection, the index for the selection is expressed as follows:

$$i = \text{midCurveIndex} + (\text{lumaAPL} - \text{midCurveIndex}) * G;$$

where i denotes an index value, midCurveIndex denotes a middle index value, lumaAPL denotes the second pixel value, and G denotes an adjustable value.

8. The image processing method according to claim 7, wherein the luminance value corresponding to the smooth mapping curve selected by the index is smaller when the index value is larger.

9. The image processing method according to claim 7, wherein when the second pixel value is smaller than the middle index value, the magnitude of the luminance value corresponding to the smooth mapping curve selected by the index is positively correlated to the magnitude of the adjustable value; when the second pixel value is larger than the middle index value, the magnitude of the luminance value corresponding to the smooth mapping curve selected by the index is negatively correlated to the magnitude of the adjustable value.

10. The image processing method according to claim 7, wherein the generating adjusted image data comprises:

remapping the second pixel value using the smooth mapping curve selected by the index to generate the adjusted image data including the plurality of adjusted pixel values.

* * * * *